United States Patent
Cimaz

(10) Patent No.: US 11,264,905 B2
(45) Date of Patent: Mar. 1, 2022

(54) DC-DC CONVERTER REGULATION CIRCUIT AND METHOD FOR DETERMINING OVERSHOOT DURATION

(71) Applicant: STMicroelectronics (Grand Ouest) SAS, Le Mans (FR)

(72) Inventor: Lionel Cimaz, Pleumeleuc (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 0 days.

(21) Appl. No.: 16/983,856

(22) Filed: Aug. 3, 2020

(65) Prior Publication Data

US 2021/0044207 A1    Feb. 11, 2021

(30) Foreign Application Priority Data

Aug. 6, 2019  (FR) ...................................... 1908993

(51) Int. Cl.
*H02M 3/158* (2006.01)
*H02M 1/08* (2006.01)
*H02M 1/00* (2006.01)

(52) U.S. Cl.
CPC ......... *H02M 3/1582* (2013.01); *H02M 1/082* (2013.01); *H02M 1/0012* (2021.05); *H02M 1/0022* (2021.05)

(58) Field of Classification Search
CPC .. H02M 1/082; H02M 1/0022; H02M 1/0012; H02M 3/1582
See application file for complete search history.

(56) References Cited

U.S. PATENT DOCUMENTS

| | | | |
|---|---|---|---|
| 9,985,522 B1* | 5/2018 | Luft ...................... | H02M 3/157 |
| 2010/0008109 A1* | 1/2010 | Morota .............. | H02M 3/33523 |
| | | | 363/21.16 |
| 2014/0062434 A1* | 3/2014 | Ouyang ................ | H02M 3/156 |
| | | | 323/271 |

FOREIGN PATENT DOCUMENTS

EP        2033301 A1    3/2009

* cited by examiner

*Primary Examiner* — Kyle J Moody
*Assistant Examiner* — Lakaisha Jackson
(74) *Attorney, Agent, or Firm* — Slater Matsil, LLP

(57) ABSTRACT

An embodiment DC to DC conversion circuit comprises a DC to DC converter and a regulation circuit. The regulation circuit comprises a comparator configured to detect, during a discharge phase of the DC to DC converter, an overshoot period during which an output voltage of the DC to DC converter exceeds a target voltage, and a timer configured to measure a duration of the overshoot period.

20 Claims, 4 Drawing Sheets

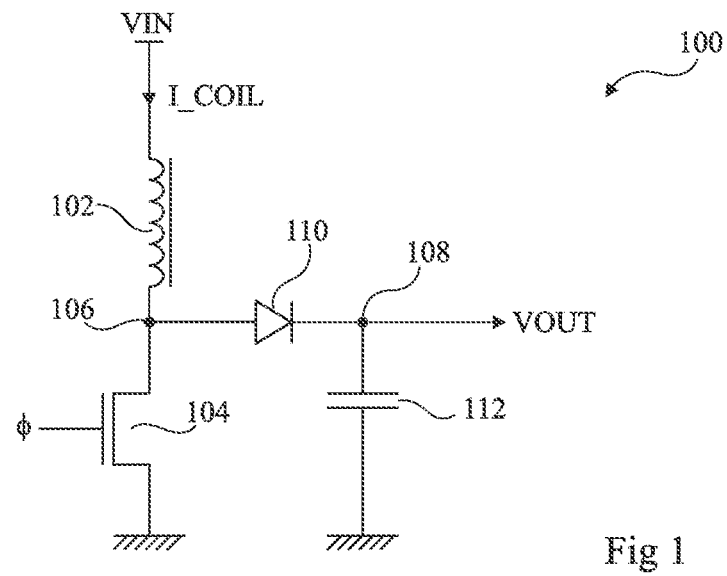
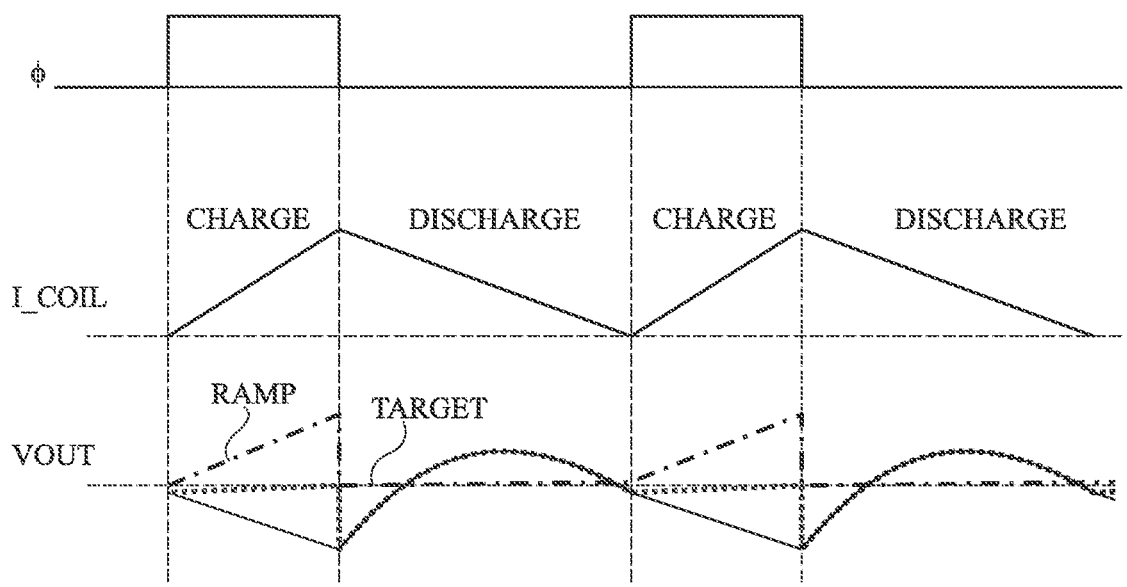
Fig 1
Fig 2

DC-DC CONVERTER REGULATION CIRCUIT AND METHOD FOR DETERMINING OVERSHOOT DURATION

CROSS-REFERENCE TO RELATED APPLICATIONS

This application claims the benefit of French Application No. 1908993, filed on Aug. 6, 2019, which application is hereby incorporated herein by reference.

TECHNICAL FIELD

The present disclosure relates generally to the field of voltage converters, and in particular to a regulation circuit and method for regulating the output voltage of a DC to DC converter.

BACKGROUND

The operation of a direct current (DC) to DC converter often involves generating an inductor current through an inductor during a charge phase of the converter, and then supplying the inductor current to an output of the DC to DC converter during a discharge phase of the converter. This operation leads to an output voltage of the converter that falls during the charge phase, and rises during at least part of the discharge phase.

In the case of boost and buck-boost converters, a difficulty is that the charge phase does not result in any voltage variation at the output of the converter, as during this phase the inductor is not supplying current to the output. In the case of buck converters, a difficulty is that the charge phase is not alone responsible for the final voltage variation. Therefore, in buck, boost, or buck-boost converters, it is generally not possible to directly control characteristics of the charge phase based on the level of the output voltage during the charge phase.

There is thus a need in the art for an improved regulation circuit, and method, for regulating the output voltage of a DC to DC converter.

SUMMARY

According to one aspect, there is provided a DC to DC conversion circuit comprising: a DC to DC converter; and a regulation circuit comprising: a comparator configured to detect, during a discharge phase of the DC to DC converter, an overshoot period during which an output voltage of the DC to DC converter exceeds a target voltage; and a timer configured to measure a duration of the overshoot period.

According to one embodiment, the DC to DC converter comprises an inductor; and during the discharge phase of the DC to DC converter, an inductor current is supplied by the inductor to an output of the DC to DC converter.

According to one embodiment, the regulation circuit comprises a controller configured to adjust a duration of an inductor charge phase and/or inductor discharge phase of the DC to DC converter based on the duration of the overshoot period.

According to one embodiment, the regulation circuit further comprises a first further comparator configured to detect a rising voltage state when the duration of the overshoot period exceeds a threshold level, and the controller is configured to adjust the duration of the inductor charge phase and/or inductor discharge phase of the DC to DC converter in response to the detection of the rising voltage state.

According to one embodiment, the regulation circuit further comprises a low pass filter configured to generate the threshold level based on a plurality of previous values of the measured duration of the overshoot period.

According to one embodiment, the regulation circuit further comprises a second further comparator configured to detect a falling voltage state when the duration of the overshoot period is lower than the threshold level, and the controller is further configured to adjust the duration of the inductor charge phase and/or inductor discharge phase of the DC to DC converter in response to the detection of the falling voltage state.

According to one embodiment, the timer comprises a counter configured to increment or decrement a count value during the overshoot period.

According to a further aspect, there is provided an electronic device comprising: a DC power source supplying a first voltage level; and the above DC to DC conversion circuit configured to convert the first voltage level into the output voltage.

According to yet a further aspect, there is provided a method of DC to DC conversion comprising: detecting, during a discharge phase of a DC to DC converter, an overshoot period during which an output voltage of the DC to DC converter exceeds a target voltage; and measuring a duration of the overshoot period.

According to one embodiment, during the discharge phase, an inductor current passing through an inductor of the DC to DC converter is supplied to an output of the DC to DC converter.

According to one embodiment, the method further comprises adjusting a duty cycle of DC to DC converter based on the duration of the overshoot period.

According to one embodiment, the method further comprises: detecting a rising voltage state when the duration of the overshoot period exceeds a threshold level; and decreasing a duration of a charge phase of the DC to DC converter in response to the detection of the rising voltage state.

According to one embodiment, the method further comprises generating the threshold level by applying a low pass filter to a plurality of previous values of the measured duration of the overshoot period.

According to one embodiment, the method further comprises: detecting a falling voltage state when the duration of the overshoot period is lower than the threshold level; and increasing a duration of a charge phase of the DC to DC converter in response to the detection of the falling voltage state.

According to one embodiment, measuring a duration of the overshoot period comprises incrementing or decrementing a count value during the overshoot period.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 1 is a circuit diagram of a DC-DC converter according to one example;

FIG. 2 is a timing diagram illustrating an example of signals in the circuit of FIG. 1;

DETAILED DESCRIPTION OF ILLUSTRATIVE EMBODIMENTS

Figure 3:
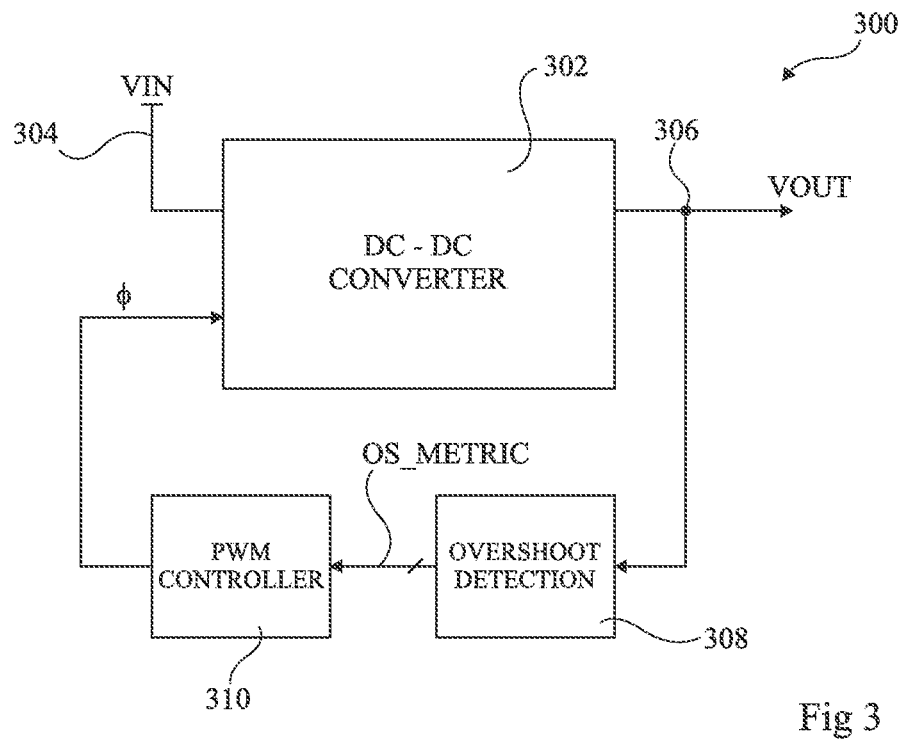
FIG. 3 schematically illustrates a DC to DC conversion circuit according to an example embodiment of the present disclosure.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, in the following, examples have been described in relation with a boost converter, and the particular circuit implementation of a buck or buck-boost direct current (DC)-DC converter has not been described in detail, such circuits being well known to those skilled in the art. Furthermore, it will be apparent to those skilled in the art how the described principles could be applied to buck converters and to buck-boost converters.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

FIG. 1 is a circuit diagram illustrating an example of a DC to DC converter 100, which in this example is a boost converter.

The DC to DC converter 100 comprises an inductor 102 coupled in series with a transistor 104 between an input supply voltage rail VIN and a ground voltage rail. For example, the transistor 104 is an n-channel metal-oxide-semiconductor (NMOS) transistor having its source connected to the ground voltage rail, and its drain connected to the inductor 102. The transistor 104 is controlled by a phase signal ɸ. An intermediate node 106 between the inductor 102 and the transistor 104 is for example coupled to an output 108 of the converter 100 via a diode 110. A capacitor 112 is for example coupled between the output node 108 and the ground voltage rail.

In FIG. 1, the current flowing through the inductor 102 is labelled I_COIL, and the voltage at the output 108 is labelled VOUT.

Operation of the DC to DC converter 100 of FIG. 1 will now be described in more detail with reference to FIG. 2.

FIG. 2 is a timing diagram illustrating an example of the phase signal ɸ, the current I_COIL and the output voltage VOUT (solid curve) in the circuit of FIG. 1.

During charge phases (CHARGE) of the converter 100, the phase signal ɸ is for example asserted, such that the transistor 104 is conducting. The inductor current I_COIL flowing through the inductor 102 rises during this charge phase, for example in a relatively linear manner. During this phase, the inductor current I_COIL passes mostly via the transistor 104, and therefore relatively little current flows to the output node 108. The voltage across the capacitor 112 therefore discharges, causing the output voltage VOUT, represented by the solid curve in FIG. 2, to fall, for example in a relatively linear manner, depending on the type of load.

During the discharge phases (DISCHARGE) the phase signal ɸ is for example brought low, such that the transistor 104 is no longer conducting. The inductor current I_COIL flowing through the inductor 102 is then directed to the output node 108, and as such, the voltage VOUT for example rises during at least some of each discharge phase. The inductor current I_COIL falls during the discharge phase, for example in a relatively linear manner. In the example of FIG. 2, the output voltage VOUT rises during each discharge phase above the target level TARGET, before falling again towards the end of each discharge phase.

As explained in the background section above, regulating the output voltage VOUT of the converter 100 is rendered difficult by the fact that the output of the converter 100 is not supplied by the inductor 102 during the charge phase, and therefore, during the charge phase, any modification of a parameter of the charge phase, such as its duration, will have no impact on the output voltage VOUT, making closed loop regulation difficult.

One manner in which this problem could be addressed is to regulate the voltage conversion based on the sum of the output voltage VOUT with a voltage ramp applied during the charge phase. Such a voltage ramp is represented by a dashed-dotted curve RAMP in FIG. 2. Such a voltage ramp is chosen to represent the effect that the energy stored in the inductance will have at the output of the converter. A dotted curve in FIG. 2 represents an example of the sum of the output voltage VOUT and the voltage ramp RAMP. Assuming that the voltage ramp is chosen correctly, the resulting sum of the ramp signal and output voltage VOUT can be used to determine when the charge phase should end, which is for example when this sum exceeds the target level TARGET.

However, a drawback of such an approach based on a voltage ramp is that a ramp generator is needed in order to generate this voltage ramp, as well as a fast adder in order to add the voltage ramp to the output voltage signal VOUT. These circuits add cost and complexity. Furthermore, if the voltage ramp does not accurately represent the energy stored in the inductor, the result will be that the average voltage applied to the load will not be correctly regulated. A particular difficulty is that, in the case that the voltages VIN and VOUT are variable, a static ramp profile will not correctly represent the stored energy. Furthermore, the charge phase will have different impacts on the output voltage depending on the mode of conversion (buck, boost, buck-boost). Therefore, a converter that is required to cover two or three of these modes could not rely on a static ramp, and the use of a variable ramp generator would add even greater cost and complexity.

FIG. 3 schematically illustrates a DC to DC conversion circuit 300 according to an example embodiment of the present disclosure.

The DC to DC conversion circuit 300 for example comprises a DC to DC converter (DC-DC CONVERTER) 302 having an input line 304 coupled to an input voltage VIN and an output 306 providing an output voltage VOUT. The DC to DC converter 302 is for example a boost converter like in the example of FIG. 1. Alternatively, the converter 302 could be another type of converter, such as a buck converter, or a buck-boost converter.

The DC to DC converter 302 also receives a phase signal ϕ generated by a feedback path comprising an overshoot detection circuit (OVERSHOOT DETECTION) 308 and a pulse width modulation controller (PWM CONTROLLER) 310.

The phase signal ϕ for example indicates the start and end of alternating charge and discharge phases of the converter 302. In the case of the boost converter 100 of FIG. 1, the converter alternates directly between the charge and discharge phases under control of a single binary phase signal ϕ. In other types of DC to DC converters, there may be more than one phase signal, such as a first phase signal ϕ_CHARGE for controlling the start and end of the charge phase, and a second phase signal ϕ_DISCHARGE for controlling the start and end of the discharge phase. Furthermore, there may be time gaps between each charge phase and the subsequent discharge phase, and/or between each discharge phase and the subsequent charge phase.

The overshoot detection circuit 308 for example receives the output voltage VOUT from the output 306 of the converter 302, and generates, based on this output voltage, an overshoot metric OS_METRIC. The PWM controller 310 for example receives the overshoot metric OS_METRIC, and generates the phase signal ϕ based on this metric. In particular, the PWM controller 310 for example adjusts the duty cycle of the phase signal ϕ, and/or a duration of the charge phase of the converter 302, based on the overshoot metric OS_METRIC.

Figure 4:
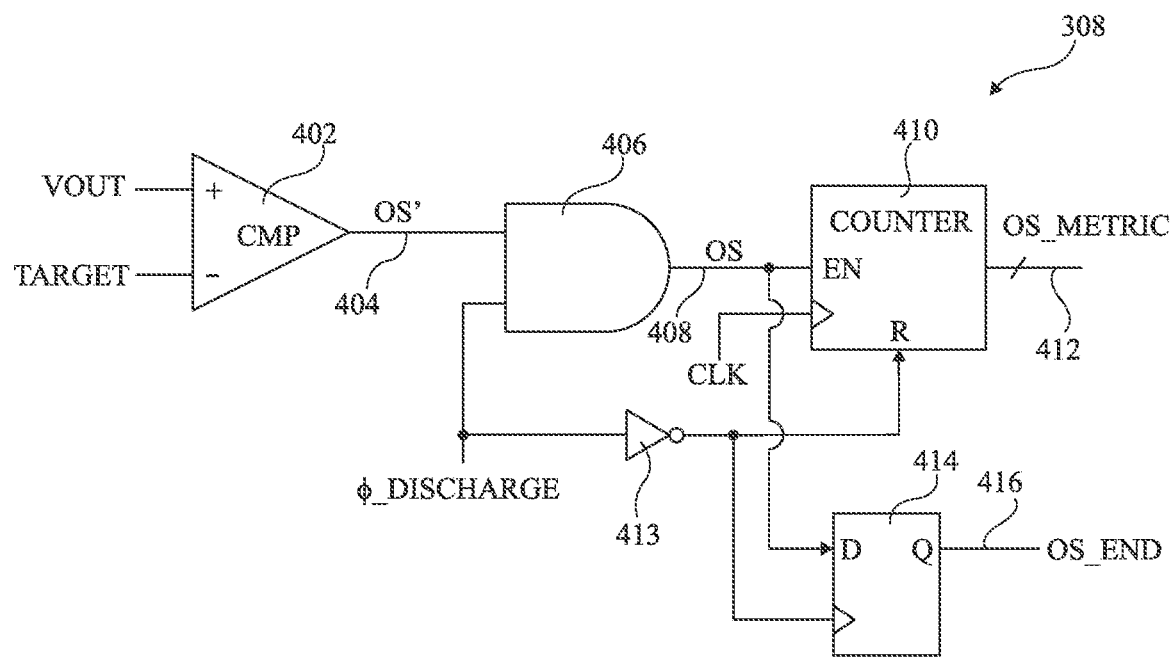
FIG. 4 schematically illustrates an overshoot detection circuit of FIG. 3 in more detail according to an example embodiment of the present disclosure.

FIG. 4 schematically illustrates the overshoot detection circuit 308 of FIG. 3 in more detail according to an example embodiment. The circuit 308 for example comprises a comparator (CMP) 402 configured to compare the output voltage VOUT of the converter 302 with a target level TARGET. For example, a positive input of the comparator 402 is coupled to the output 306 of the converter 302, and a negative input of the comparator 402 receives the target level TARGET, which represents the target voltage to be supplied at the output 306 of the DC to DC converter 302. The comparator 402 generates an overshoot signal OS' at its output 404, this output signal OS' indicating an overshoot period during which the output voltage VOUT exceeds the target level TARGET.

The output 404 of the comparator 402 is for example coupled to one input of an AND gate 406, the other input of which receives a signal ϕ_DISCHARGE, indicating when the converter 302 is in the discharge phase. For example, in one embodiment, the signal ϕ_DISCHARGE corresponds to the inverse of the phase signal ϕ.

An output signal OS at the output 408 of the AND gate 406 represents the overshoot period occurring during the discharge phase.

The output 408 of the AND gate 406 is for example provided to a timer 410, which measures a duration of the overshoot period. In the example of FIG. 4, the timer is implemented by a counter (COUNTER), which is clocked by a clock signal CLK. The counter 410 generates, for example at the end of each discharge phase, an output count value forming the overshoot metric OS_METRIC. In some embodiments, the counter 410 is reset, at the end of each discharge phase, by applying the inverse of the signal ϕ_DISCHARGE, generated for example by an inverter 413, to a reset input R of the counter. Rather than a counter, another type of device could be used to evaluate the overshoot duration. For example, the overshoot duration could be time based on a capacitor discharge. However, the advantage of a digital solution, such as one based on a counter, is that it allows the complexity of the analog circuitry to reduced.

In some embodiments, the overshoot detection circuit 308 also comprises means for detecting whether a voltage overshoot is still present at the end of each discharge phase. For example, a flip-flop 414 is used to sample the signal OS at the end of the discharge phase. For example, the flip-flop 414 has its data input coupled to the output 408 of the AND gate 406, and its clock input receiving the signal ϕ_DISCHARGE inverted by the inverter 413. The flip-flop 414 for example provides at its output 416 a signal OS_END that is asserted when the signal OS is asserted at the end of the discharge phase.

Operation of the overshoot detection circuit 308 of FIG. 4 will now be described in more detail with reference to FIG. 5.

Figure 5:
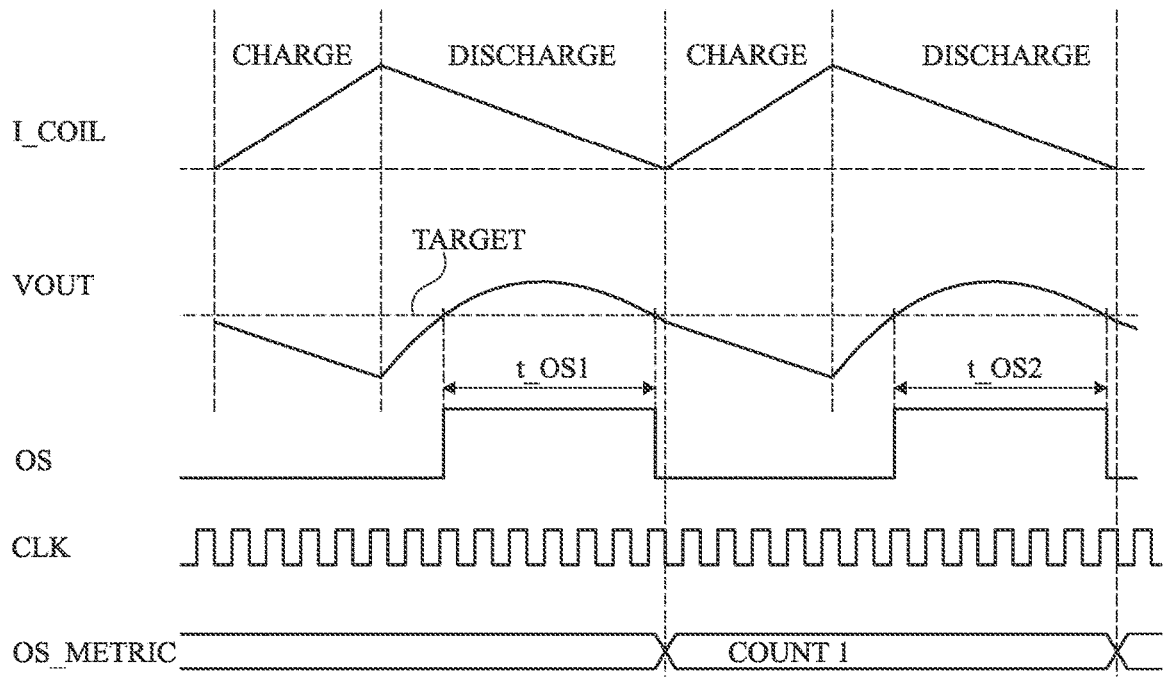
FIG. 5 is a timing diagram illustrating an example of signals in the circuit of FIG. 4.

FIG. 5 is a timing diagram illustrating examples of the inductor current I_COIL, output voltage VOUT, overshoot signal OS, clock signal CLK and overshoot metric OS_METRIC in the circuit of FIG. 4.

The inductor current I_COIL and the output voltage VOUT are for example similar to the example of FIG. 2, and will not be described again in detail.

Like in the example of FIG. 2, there are two cycles of charge/discharge phases shown in the example of FIG. 5. The overshoot signal OS is for example asserted during each of the discharge phases of FIG. 5 during a period in which the output voltage VOUT exceeds the target voltage TARGET, and these overshoot periods are respectively of durations t_OS1 and t_OS2 in the example of FIG. 5.

The clock signal CLK for example has a frequency of between 10 and 1000 times that of the converter, in other words the clock signal CLK has a clock period that is between 10 and 1000 times smaller than the period of the charge/discharge phases.

The counter 410 is for example configured to output an updated count value at the end of each discharge period. Thus, at the end of the first discharge period of FIG. 5, the count value COUNT1 is for example output, and represents the duration t_OS1 of the overshoot period during the first discharge phase. This count value COUNT1 is for example used to adjust the voltage conversion. For example, the PWM controller 310 is configured to adjust the duration of the subsequent charge phase and/or of the subsequent discharge phase based on this count value. In some embodiments, only the duration of the charge phase is adjusted based on the count value COUNT1.

The PWM controller 310 is for example configured to adjust the phase signal ϕ, or phase signals if there more than one, in order to reduce the output voltage VOUT if the overshoot period is equal to, or substantially equal to, the duration of the discharge phase, for example equal to over 90% of the duration of the discharge phase. Additionally or alternatively, the PWM controller 310 receives the signal OS_END from the flip-flop 414, and is also for example configured to reduce the output voltage if overshoot is still present at the end of the discharge phase, as indicated by the signal OS_END.

The PWM controller 310 is for example configured to adjust the phase signal ϕ, or phase signals if there more than one, in order to increase the output voltage VOUT if the overshoot period is equal to zero, in other words if the output of the comparator 402 is never asserted during the discharge phase.

For example, to reduce the output voltage VOUT, the PWM controller 310 for example reduces the duration of the charge phase, and to increase the voltage VOUT, the PWM circuit 310 for example increases the duration of the charge phase.

In other embodiments, the PWM controller 310 is configured to adjust the duration of the charge phase in order to obtain a given range of overshoot duration, equal for example to a range of between 20% and 80% of the duration of the discharge phase, or of between 10% and 90% of the duration of the discharge phase.

Figure 6:
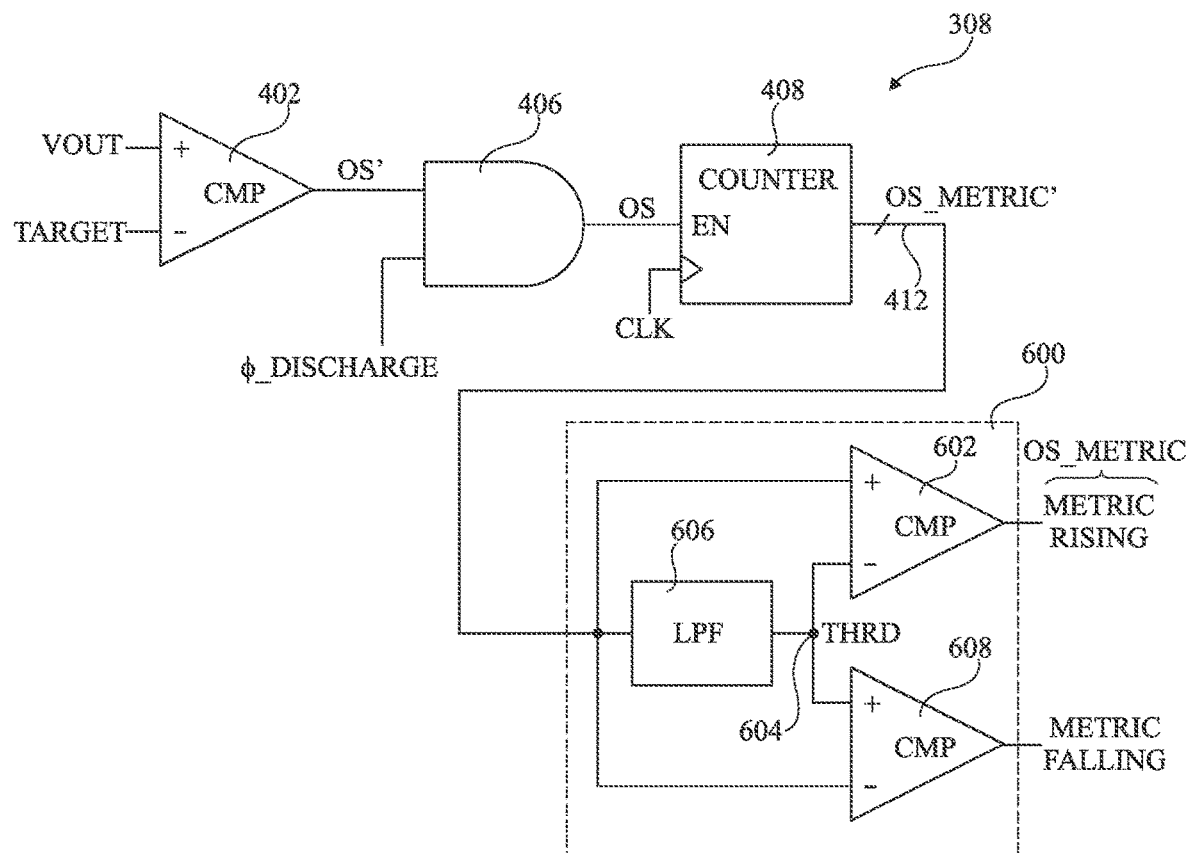
FIG. 6 schematically illustrates the overshoot detection circuit of FIG. 3 in more detail according to a further example embodiment of the present disclosure.

FIG. 6 schematically illustrates the overshoot detection circuit 308 of FIG. 3 in more detail according to a further example embodiment of the present disclosure. Part of the circuit of FIG. 6 is the same as that of FIG. 4, and those features that are in common have been labelled with like reference numerals and will not be described again in detail.

In the example of FIG. 6, the counter 408 provides an output signal OS_METRIC' provided to a further metric evaluation circuit 600, which generates the overshoot metric signal OS_METRIC provided to the PWM controller 310.

The circuit 600 for example comprises a comparator (CMP) 602, having its positive input coupled to the output line 412 of the counter 408, and its negative input coupled to a node 604 providing a threshold level THRD. The comparator 602 is configured to compare the value of the overshoot metric OS_METRIC' with the threshold level THRD, and to assert an output signal METRIC RISING when the threshold is exceeded. This signal METRIC RISING indicates a rising voltage state of the converter, in other words that the average output voltage is rising.

The threshold level THRD is for example generated by a low pass filter (LPF) 606 based on one or more previous values of the signal OS_METRIC'. For example, the low pass filter generates an average of N previous count values, where N is for example equal to between 2 and 20.

In some embodiments, the circuit 600 further comprises another comparator 608 having its positive input coupled to the node 604, and its negative input coupled to the output line 412 of the counter 408. The comparator 608 is for example configured to compare the count value of the overshoot metric OS_METRIC' with the threshold level THRD, and to a assert output signal METRIC FALLING when the overshoot metric OS_METRIC' is below the threshold level THRD. This signal METRIC FALLING indicates a falling voltage state of the converter, in other words that the average output voltage is falling.

The overshoot metrics METRIC RISING and METRIC FALLING for example permit the PWM controller 10 to adjust the phase signal φ in order that the overshoot metric remains relatively stable. For example, if the overshoot metric indicates an overshoot duration of zero, or if the signal METRIC FALLING is asserted, the PWM controller 310 for example increases the average output voltage VOUT, for example by increasing the duration of the charge phase. If, however, the overshoot metric indicates an overshoot duration substantially equal to the duration of the discharge phase, or if the signal METRIC RISING is asserted, the PWM controller 310 for example decreases the average output voltage VOUT, for example by decreasing the duration of the charge phase. In this way, after some convergence cycles, the charge phase duration will for example converge to a static value that results in a stable overshoot duration.

Figure 7:
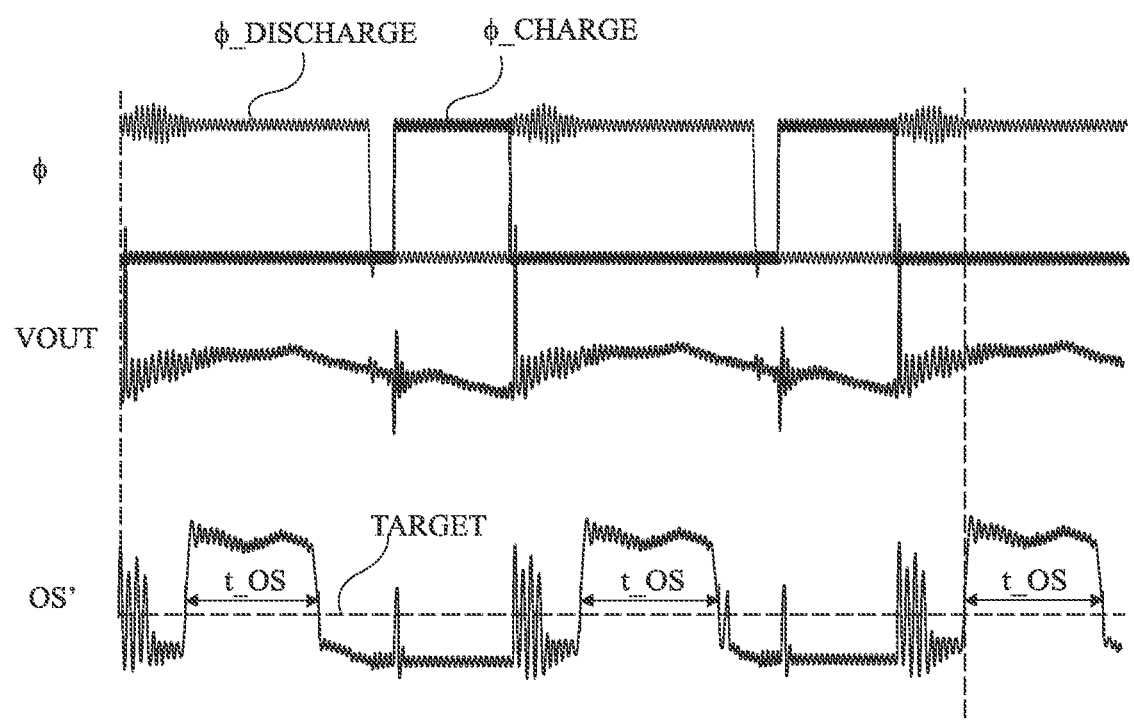
FIG. 7 is a timing diagram representing measured signals in the circuit of FIG. 3.

FIG. 7 is a timing diagram representing measured signals in the circuit of FIG. 3 based on the DC to DC converter 302 operating in a buck-boost mode. FIG. 3 shows in particular the QR (Quasi Resonant) steady state operation, also known as the Transition mode. Running at QR means that the current in the inductor falls to zero at the end of the discharge phase and a new charge phase follows immediately after the discharge phase. In other words, the QR mode is a point existing just between DCM (Discontinuous Conduction Mode) and CCM (Continuous Conduction Mode).

FIG. 7 represents charge and discharge phase signals φ_CHARGE, φ_DISCHARGE, the output voltage VOUT, and the overshoot signal OS'. The measured signals of FIG. 7 are based on a converter frequency of 259.7 kHz, an input voltage VIN of 12 V, and a target voltage of 18 V. The average output voltage was measured at 18.017 V, with a relatively low amplitude of 294 mV.

An advantage of the embodiments described herein is that the output voltage of a DC to DC converter can be regulated in a simple fashion by a circuit of relatively low cost and complexity. Indeed, the solution for example involves only several relatively low cost comparators and a counter.

Various embodiments and variants have been described. Those skilled in the art will understand that certain features of these embodiments can be combined and other variants will readily occur to those skilled in the art. In particular, it will be apparent to those skilled in the art that the embodiments described herein could be applied to any type of DC to DC converter.

What is claimed is:

1. A direct current (DC) to DC conversion circuit comprising:
   a DC to DC converter; and
   a regulation circuit comprising:
   a first comparator configured to detect, during a discharge phase of the DC to DC converter, an overshoot period during which an output voltage of the DC to DC converter exceeds a target voltage;
   a timer configured to measure a duration of the overshoot period;
   a second comparator configured to detect a rising voltage state when the duration of the overshoot period exceeds a threshold level; and
   a low pass filter configured to generate the threshold level based on a plurality of previous values of the measured duration of the overshoot period.

2. The DC to DC conversion circuit of claim 1, wherein:
   the DC to DC converter comprises an inductor; and
   during the discharge phase of the DC to DC converter, the inductor is configured to supply an inductor current to an output of the DC to DC converter.

3. The DC to DC conversion circuit of claim 1, wherein the regulation circuit comprises a controller configured to adjust a duration of an inductor charge phase and/or inductor discharge phase of the DC to DC converter based on the duration of the overshoot period.

4. The DC to DC conversion circuit of claim 3, wherein the controller is configured to adjust the duration of the inductor charge phase and/or inductor discharge phase of the DC to DC converter in response to the detection of the rising voltage state.

5. The DC to DC conversion circuit of claim 4, wherein the regulation circuit further comprises a third comparator configured to detect a falling voltage state when the duration of the overshoot period is lower than the threshold level, and wherein the controller is further configured to adjust the duration of the inductor charge phase and/or inductor discharge phase of the DC to DC converter in response to the detection of the falling voltage state.

6. The DC to DC conversion circuit of claim 1, wherein the low pass filter is configured to generate the threshold level based on between 2 and 20 previous values of the measured duration of the overshoot period.

7. The DC to DC conversion circuit of claim 1, wherein the timer comprises a counter configured to increment or decrement a count value during the overshoot period.

8. An electronic device comprising:
a direct current (DC) power source supplying a first voltage level; and
a DC to DC conversion circuit configured to convert the first voltage level into an output voltage, the DC to DC conversion circuit comprising:
 a DC to DC converter; and
 a regulation circuit comprising:
  a first comparator configured to detect, during a discharge phase of the DC to DC converter, an overshoot period during which the output voltage of the DC to DC converter exceeds a target voltage;
  a timer configured to measure a duration of the overshoot period;
  a second comparator configured to detect a rising voltage state when the duration of the overshoot period exceeds a threshold level; and
  a low pass filter configured to generate the threshold level based on a plurality of previous values of the measured duration of the overshoot period.

9. The electronic device of claim 8, wherein:
the DC to DC converter comprises an inductor; and
during the discharge phase of the DC to DC converter, the inductor is configured to supply an inductor current to an output of the DC to DC converter.

10. The electronic device of claim 8, wherein the regulation circuit comprises a controller configured to adjust a duration of an inductor charge phase and/or inductor discharge phase of the DC to DC converter based on the duration of the overshoot period.

11. The electronic device of claim 10, wherein the controller is configured to adjust the duration of the inductor charge phase and/or inductor discharge phase of the DC to DC converter in response to the detection of the rising voltage state.

12. The electronic device of claim 8, wherein the low pass filter is configured to generate the threshold level based on between 2 and 20 previous values of the measured duration of the overshoot period.

13. The electronic device of claim 8, wherein the timer comprises a counter configured to increment or decrement a count value during the overshoot period.

14. A method of direct current (DC) to DC conversion comprising:
detecting, during a discharge phase of a DC to DC converter, an overshoot period during which an output voltage of the DC to DC converter exceeds a target voltage;
measuring a duration of the overshoot period;
detecting a rising voltage state in response to the duration of the overshoot period exceeding a threshold level; and
generating the threshold level by applying a low pass filter to a plurality of previous values of the measured duration of the overshoot period.

15. The method of claim 14, further comprising, during the discharge phase, supplying, to an output of the DC to DC converter, an inductor current passing through an inductor of the DC to DC converter.

16. The method of claim 14, further comprising adjusting a duty cycle of DC to DC converter based on the duration of the overshoot period.

17. The method of claim 16, further comprising:
decreasing a duration of a charge phase of the DC to DC converter in response to the detection of the rising voltage state.

18. The method of claim 17, further comprising:
detecting a falling voltage state in response to the duration of the overshoot period being lower than the threshold level; and
increasing the duration of the charge phase of the DC to DC converter in response to the detection of the falling voltage state.

19. The method of claim 14, wherein the generating the threshold level comprises applying the low pass filter to between 2 and 20 previous values of the measured duration of the overshoot period.

20. The method of claim 14, wherein measuring the duration of the overshoot period comprises incrementing or decrementing a count value during the overshoot period.

* * * * *